(12) United States Patent
Lhotak

(10) Patent No.: US 8,001,725 B2
(45) Date of Patent: Aug. 23, 2011

(54) SHAFT JOINT

(75) Inventor: Roger W. Lhotak, Hanover Park, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 890 days.

(21) Appl. No.: 11/240,711

(22) Filed: Sep. 30, 2005

(65) Prior Publication Data

US 2007/0077115 A1 Apr. 5, 2007

(51) Int. Cl.
*E05F 11/00* (2006.01)

(52) U.S. Cl. .......... 49/199; 403/290; 403/293; 403/341; 403/354; 403/364; 403/329

(58) Field of Classification Search .......... 49/197, 49/199; 403/118, 326, 329, 290, 293, 341, 403/354, 364
See application file for complete search history.

(56) References Cited

U.S. PATENT DOCUMENTS

| | | | |
|---|---|---|---|
| 889,786 A * | 6/1908 | Keiner | 439/371 |
| 1,992,006 A | 2/1935 | Greegor | |
| 2,923,541 A | 2/1960 | Gessell | |
| 2,937,042 A * | 5/1960 | Wilder, Jr. | 403/354 |
| 3,160,200 A | 12/1964 | McKee | |
| 3,247,732 A | 4/1966 | Barnhart | |
| 3,471,189 A | 10/1969 | Ness | |
| 3,965,792 A * | 6/1976 | King, Jr. | 411/361 |
| 4,241,540 A | 12/1980 | Depperman | |
| 4,334,161 A | 6/1982 | Carli | |
| 4,352,585 A | 10/1982 | Spalding | |
| 4,472,910 A | 9/1984 | Iha | |
| 4,551,118 A * | 11/1985 | Spisz | 464/182 |
| 4,694,544 A * | 9/1987 | Chapman | 24/625 |
| 4,976,168 A | 12/1990 | Lotznicker et al. | |
| 5,011,353 A * | 4/1991 | Boyd | 411/383 |
| 5,085,094 A | 2/1992 | Clawson et al. | |
| 5,111,711 A | 5/1992 | Engel et al. | |
| 5,143,477 A | 9/1992 | Kanehira et al. | |
| 5,148,718 A | 9/1992 | Kakuguchi et al. | |
| 5,269,572 A * | 12/1993 | Mefferd | 285/330 |
| 5,577,415 A * | 11/1996 | Reasoner | 74/502.4 |
| 5,588,257 A | 12/1996 | Duhame et al. | |
| 5,743,046 A | 4/1998 | Siegler et al. | |
| 5,803,149 A | 9/1998 | Halley et al. | |
| 5,852,949 A * | 12/1998 | Cartensen | 74/424.94 |
| 5,931,212 A | 8/1999 | Mullet et al. | |
| 6,119,544 A * | 9/2000 | Cebollero | 74/502.4 |
| 6,134,835 A | 10/2000 | Krupke et al. | |
| 6,401,792 B1 | 6/2002 | Mullet et al. | |
| 6,418,809 B1 | 7/2002 | Hormann | |
| 6,568,454 B1 | 5/2003 | Mullet et al. | |

(Continued)

*Primary Examiner* — Jerry Redman

(74) *Attorney, Agent, or Firm* — Fitch, Even, Tabin & Flannery

(57) ABSTRACT

A shaft such as a worm drive shaft for a movable barrier operator is disclosed. The shaft includes at least two shaft segments having connection ends. The shaft segments include respective connection ends permitting a first connection end to be joined with a second connection end by inserting a portion of at least one of the connection ends within the other connection end along the longitudinal axis of the shaft. The shaft segments may be retained by a resiliently expandable connector such as a snap ring. The connector may expand to permit the joining and then contract to be received within a surface recess on a connection end. The connector may be part of or pre-assembled on a connection end, such as by being positioned within a surface recess thereof. The connector may provide a pre-determined position for joining the first and second connection ends.

11 Claims, 8 Drawing Sheets

U.S. PATENT DOCUMENTS

| | | |
|---|---|---|
| 6,735,905 B1 | 5/2004 | Miller |
| 6,739,372 B2 | 5/2004 | Mullet et al. |
| 6,782,662 B2 | 8/2004 | McCartney et al. |
| 6,845,804 B2 | 1/2005 | Mullet |
| 6,959,751 B2 | 11/2005 | Savard et al. |
| 7,004,671 B2 * | 2/2006 | Tawara et al. ............ 403/341 |
| 7,007,427 B2 | 3/2006 | Sanke et al. |
| 7,174,673 B2 | 2/2007 | Sanke et al. |
| 7,188,545 B2 * | 3/2007 | Nagle et al. ............ 74/502.6 |
| 7,246,647 B2 | 7/2007 | Mullet et al. |
| RE40,001 E | 1/2008 | Siegler et al. |
| 2002/0071718 A1 * | 6/2002 | Marty et al. ............ 403/293 |
| 2003/0205338 A1 | 11/2003 | Mullet et al. |
| 2005/0235563 A1 | 10/2005 | Mullet et al. |
| 2006/0191205 A1 | 8/2006 | Mullet et al. |
| 2006/0237150 A1 | 10/2006 | Olmsted |

* cited by examiner

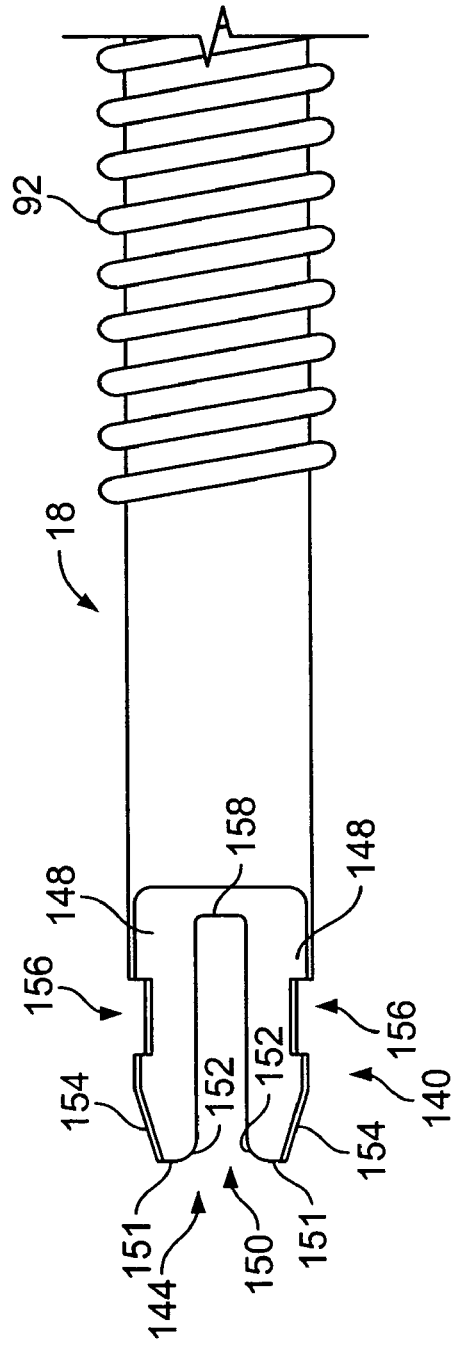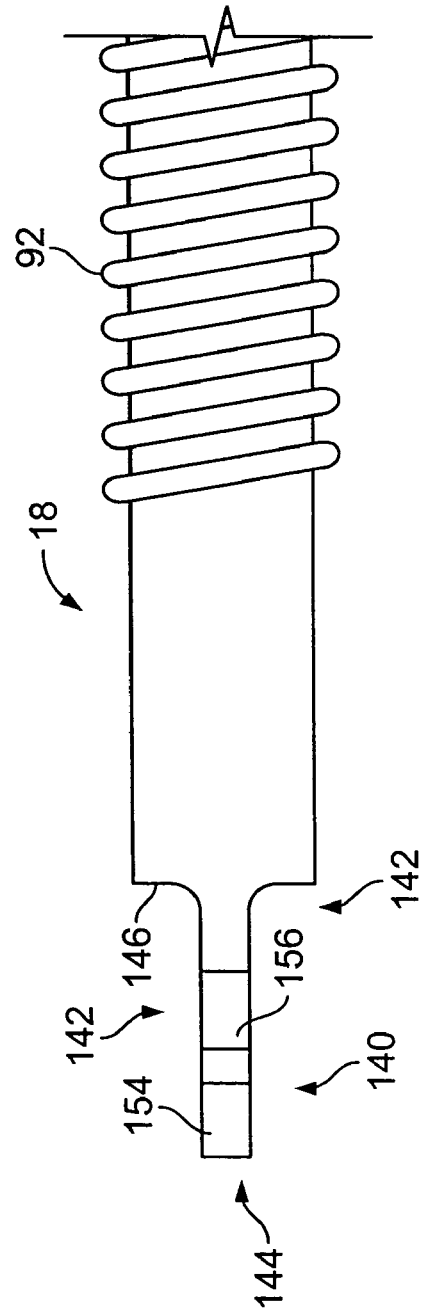

SHAFT JOINT

FIELD OF THE INVENTION

The invention relates to a connection between elongated members and, in particular, to a connection between sections or segments of a drive shaft for a movable barrier operator.

BACKGROUND OF THE INVENTION

Many residential garages are equipped with an operator for providing electromechanical movement of the garage door between an open position and a closed position. Various systems have been devised for attaching the operator to the garage door to effect such movement. These systems may include a cable, a belt, or a threaded shaft commonly referred to as a worm shaft.

For many residential owners, the installation of a garage door seems a relatively easy, do-it-yourself task. Instruction manuals are presented with detailed pictures and precautions to guide people through the steps, necessitating equipment as common as a screwdriver and a power drill. Before beginning installation, however, the would-be installer must first acquire or purchase the system and transport it to the installation site.

One of the issues presented with transporting the operator system to the installation site is the size of the system. When the movable barrier or door is in an open position, most garages provide an opening roughly equivalent to what one would expect from a standard door frame, approximately eighty inches. A typical garage door will, in the closed position, rest on a ground surface such as a garage floor and generally span the garage door opening. To open the garage by moving the door to the open position, requires the door to shift from contact with the ground surface to a position sufficient to allow passage for cars or people or other items through the garage opening. That is, the door will travel approximately eighty inches between the open and closed position. For taller garage openings equipped with larger doors, it may be desired for the door to travel a distance greater than eighty inches.

For operator systems utilizing a worm shaft, the distance the door must travel determines, to some extent, the length of the worm shaft that must be transported to an installation site. That is, the shaft must be of sufficient length to provide for the described amount of travel. Though some people have uncommonly large automobiles or other vehicles that may provide for a shaft having an eight-foot length, many people find it cumbersome and difficult to load such an item into their car. Additionally, the operator system is desirably packaged and sold in a single carton, inside of which includes a generally rectangular operator box including a motor and a connection for the worm shaft, the worm shaft itself along with a supporting rail, and hardware components for coupling the rail and shaft with the garage door and for mounting the operator box in the garage, such as to a ceiling or rafter support. Were the rail and shaft a single component of eighty or more inches, and this were packaged in a single carton with a relatively heavy operator box, the entire carton can prove unwieldy for many people.

In order to address this problem, there are a number of currently known approaches for providing a worm shaft having a plurality of shorter segments which are coupled together. In this manner, the operator system may be packaged in a smaller and easier-handled carton. A user or installer may then assemble the segments into the full-length worm shaft prior to installation.

One example of a segmented shaft is described in U.S. Pat. Nos. 4,352,585, and 5,085,094. To form a connection or joint between first and second shaft segments, cooperating structure is provided on the ends of the shafts. More particularly, each joint end is generally cylindrical and includes a first cut section at a first depth to form a surface parallel to the longitudinal axis of the shaft, and a second cut section at a second depth greater than and parallel to the first depth. The second cut section is made further away from a shaft terminus so that it forms a notch in the cylindrical end. Respective notches in the first and second shaft segments are joined so that the first cut section of the first segment is mated with the second cut section of the second segment, and the second cut section of the first segment is mated with the first cut section of the second segment. In this manner, the mated end portions including the cut sections together form a cylindrical outer surface.

The end portions must be maintained in the mated relationship. To accomplish this, a full ring piece is positioned around the cylindrical portion of one of the segments so that it is clear of that segment's notch prior to mating with the other segment. Once mated, the ring is slid over the notches to hold the segments together. Lastly, a partial ring is snapped onto the portion from where the ring is slid to prevent the full ring from backing away from the joint.

With the described notched-connection utilizing the rings, a number of components and steps are required for assembly. Users or installers are required to first slide on the full ring as a separate component, then couple the notches, slide the ring over the joint, then snap on the separate component of the partial ring. This requires a user to keep track of small components and to manipulate the small components in conjunction with the large shaft segments.

Accordingly, there has been a need for a simpler and more user-friendly assembly and joint for a shaft for a movable barrier operator system.

SUMMARY OF THE INVENTION

In accordance with one aspect, an elongated drive shaft such as a worm shaft for use with a movable barrier operator is disclosed. The elongated shaft has worm threads and is rotated around its central longitudinal axis by a motor. A trolley is engaged with the threads so that rotation of the shaft effects translation of the trolley along a support rail in which the shaft is located.

The shaft includes at least two segments that are joined to ease the shipping, packaging, transportation, and assembly by a user or installer. The trolley has engagement portions such as teeth that extend a length sufficient to maintain engagement with the threads as the trolley passes over or travels by the joint.

The joint is provided as a simple connection. In particular, first and second connection ends are provided on respective shaft segments. The connection ends include male and female connections such that the first connection end is joined with the second connection with a single linear motion.

Once joined, a connector prevents separation of the connection ends. As one of the connection ends is advanced towards the other connection end, the connector expands or shifts to permit the advancement and joining of the connection ends. After the connection ends are joined at a predetermined position, the connector contracts to couple with the advancing connection end. In one form, the connector is a separate component pre-assembled with one of the connection ends, and the other connection end forces the expansion or shifting of the connector during relative advancement of the connection ends. In a preferred embodiment, the connector is a split ring pre-assembled in a recess on a first connection end, and the second connection end is received within the split ring to shift the split ring to an expanded configuration. Once the connection ends are sufficiently advanced relatively, the split ring becomes aligned with a recess on the second connection, thereby contracting to shift into the second connection end recess.

In accordance with one aspect, a method of forming an elongated drive shaft for a movable barrier operator system for moving a movable barrier between positions is provided. The method includes providing a first shaft segment having a longitudinal axis of rotation and a first connection end; providing a second shaft segment having a longitudinal axis of rotation and a second connection end; aligning the shaft segments along a common axis of rotation; and joining the first and second connection ends by forcing a cooperating structure of each connection end to be received by cooperating structure on the other connection end. The method may further include providing an expandable portion on the cooperating structure of one of the first connection end, wherein the joining of the first connection end and second connection ends includes forcing the cooperating structure of the second connection end against the expandable portion of the first connection end to expand the expandable portion. Even further, the method may include aligning a portion of the cooperating structure on the second connection end with the expandable portion and with a portion of the cooperating structure of the first connection end; and contracting the expandable portion into the aligned second connection end.

BRIEF DESCRIPTION OF THE DRAWINGS

In the drawings.

FIG. 8 is a fragmentary side elevational view of the second drive shaft segment showing a second connection end;

FIG. 9 is a fragmentary side elevational view of the second connection end of the second drive shaft segment rotated ninety degrees from FIG. 8;

DESCRIPTION OF THE PREFERRED EMBODIMENTS

Figure 1:
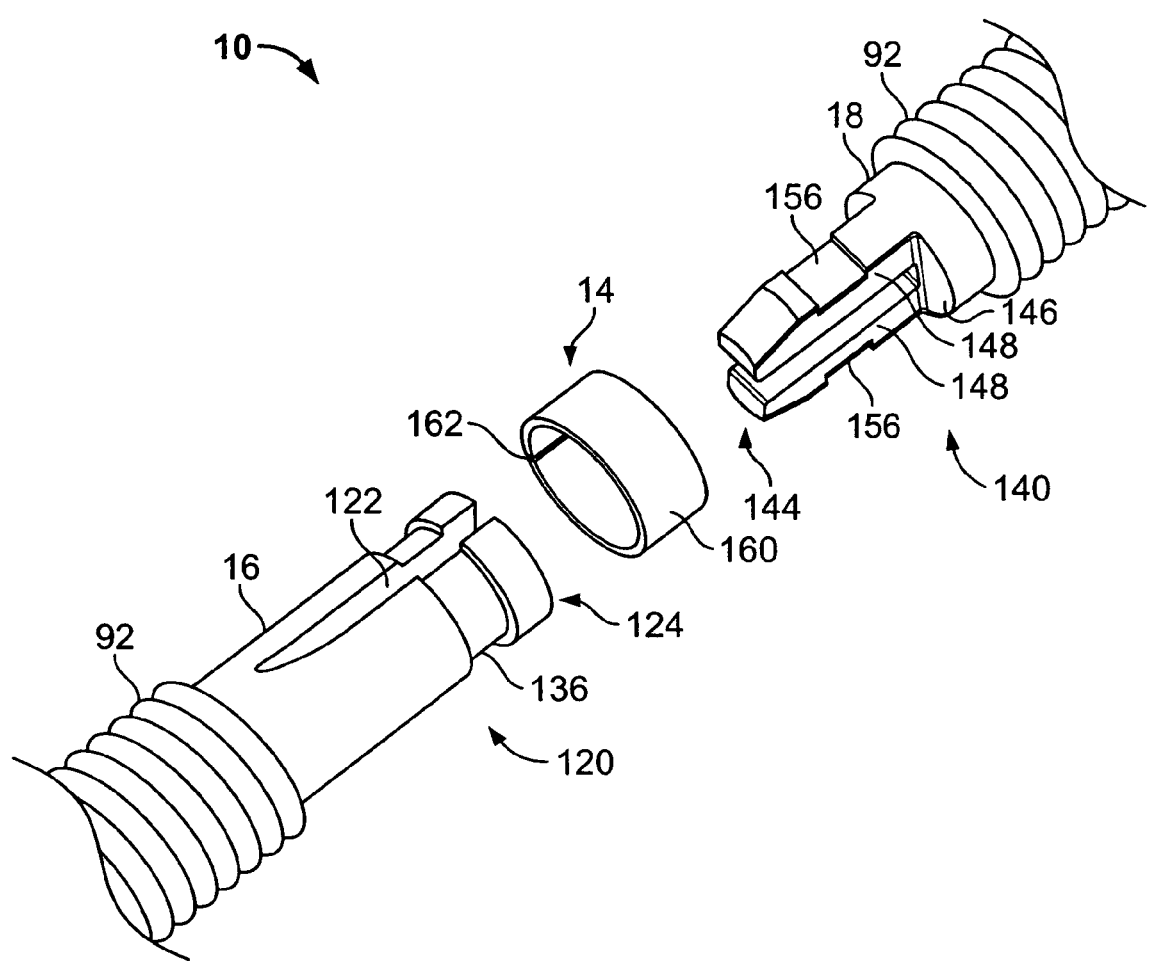
FIG. 1 is an exploded and fragmentary perspective view of components of a shaft for forming a joint including a first drive shaft segment, a second drive shaft segment, and a connector ring.
Figure 2:
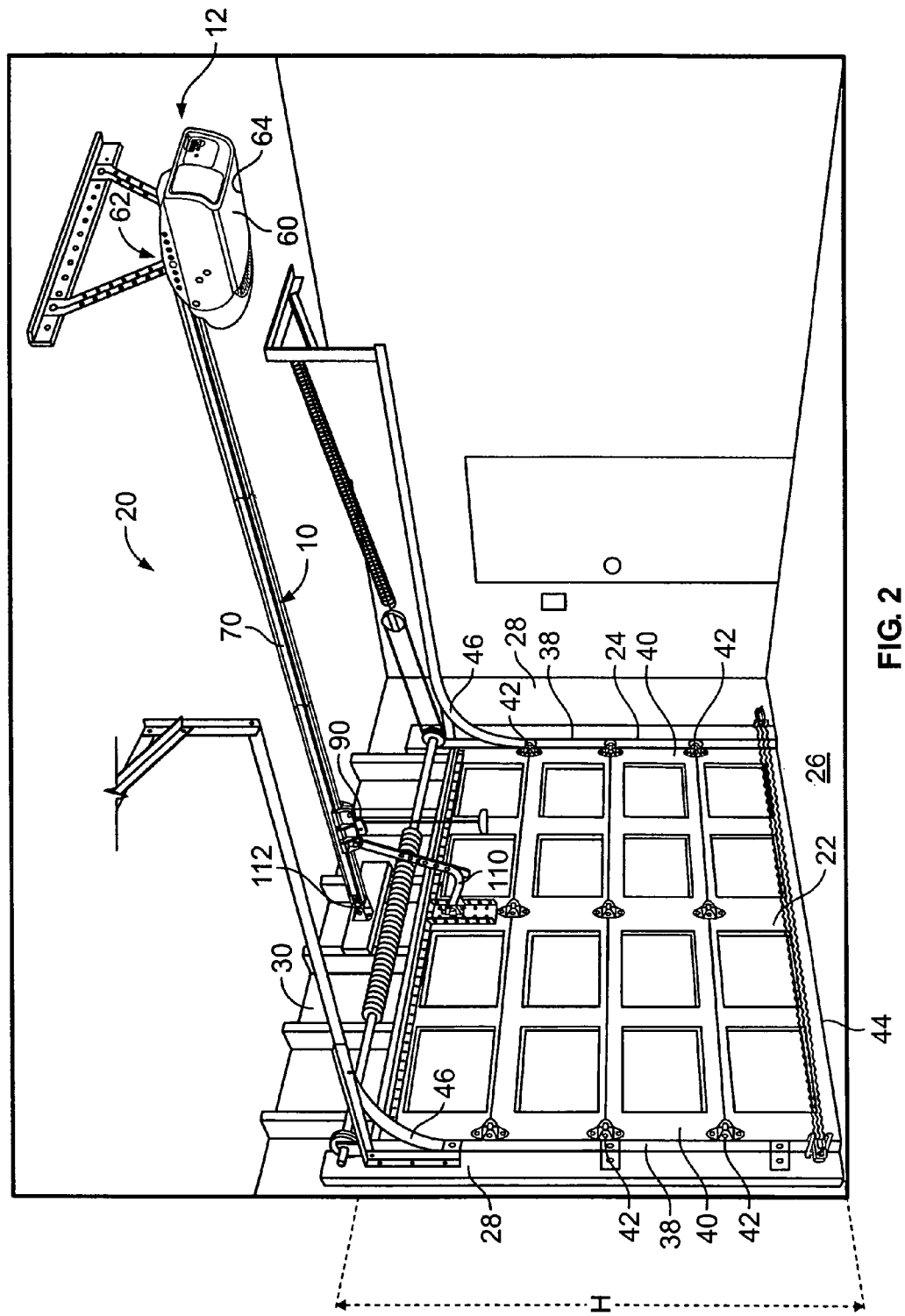
FIG. 2 is a perspective view of a representational interior of a garage showing a movable barrier operator system for shifting a movable barrier between open and closed positions.

Referring initially to FIGS. 1 and 2, a rotating shaft 10 for use with a operator system 12 for moving a movable barrier 22 between positions defining open and closed positions for a garage 20 is depicted. The rotating shaft 10 forms a connection joint 14 between first and second shaft segments 16, 18. The garage 20 includes an opening 24 generally bound by a ground or floor surface 26, side walls 28, and a top wall 30. FIG. 2 illustrates the garage 20 with the barrier 22 in a closed position such that the opening 24 is generally spanned by the barrier 22. The operator system 12 is used to raise the barrier 22 from the closed position to an open position to allow ingress and egress of persons, vehicles, or the like, through the opening 24.

The barrier 22 is guided between the open and closed positions by rails or tracks 38 mounted to the side walls 28. The barrier has sides 40 which include axle and wheel assemblies 42. The wheel assemblies 42 are positioned within the tracks 38. In order to move from the open and closed position, the barrier 22 must move an appropriate distance for desired opening. That is, though the opening 24 has a particular height H, the barrier 22 may move to expose to opening more or less than the height H. For instance, it may be only necessary for the barrier 22 to move to the open position so there is a clearance below a bottom edge 44 of the barrier 22 that is some amount less than the height H. However, actual distance traveled by the bottom edge 44 of the barrier 22 may be different than the clearance amount as the tracks 38 have a curved upper portion 46. The shaft 10 must provide a length that permits the distance traveled by the bottom edge 44 of the barrier 22 between the open and closed positions.

Figure 3:
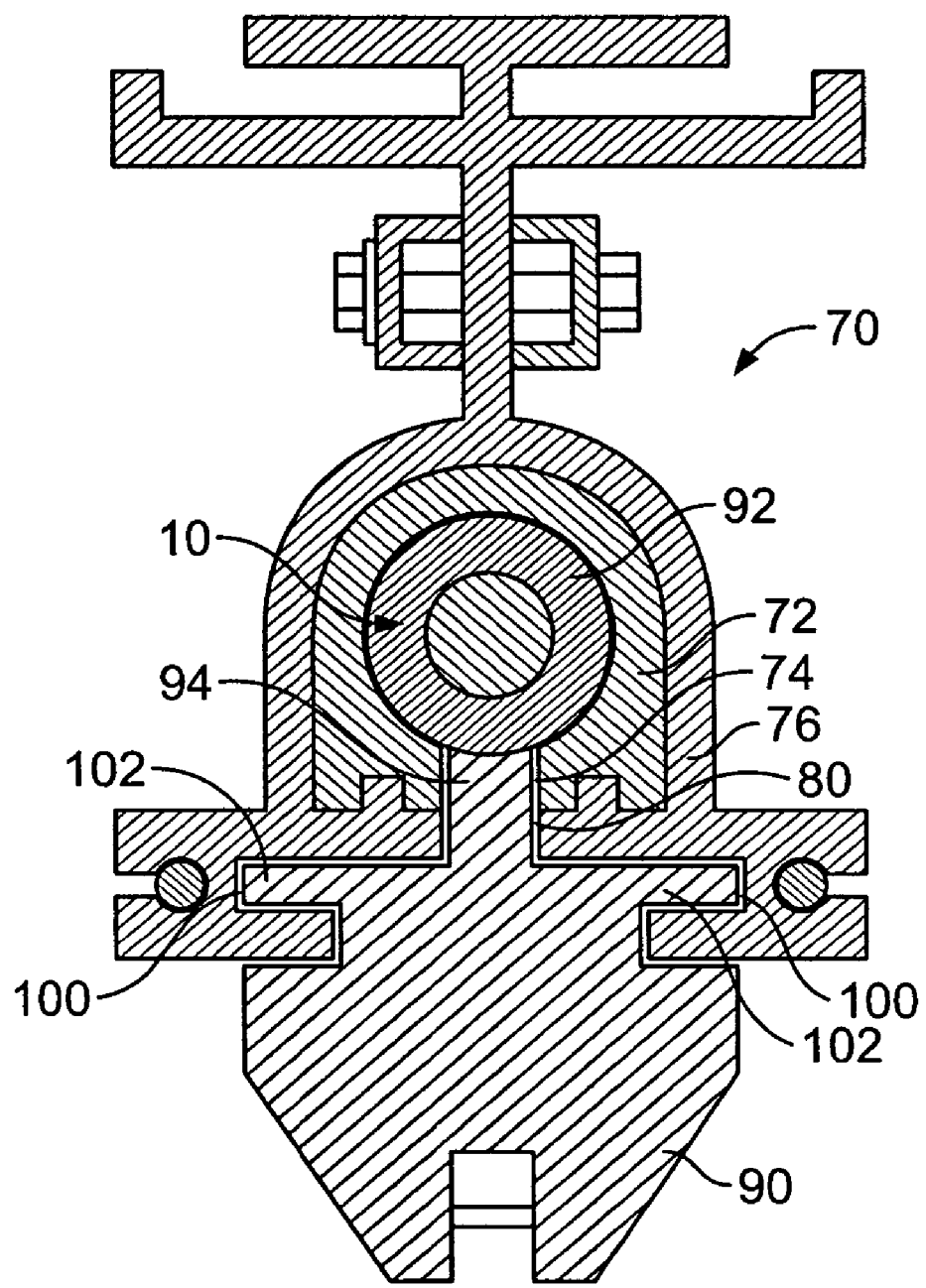
FIG. 3 is a cross-sectional view of a portion of the movable barrier operator system including an operator trolley operably connectable to the movable barrier, a support rail for attaching to an interior of the garage, and a drive shaft rotatably supported by the support rail for translating the operator trolley for shifting the movable barrier between the open and closed positions.

The operator system 12 includes an operator or drive box 60 providing power for moving the barrier 22. The drive box 60 includes an electrical motor (not shown) for providing rotation power to a socket connection formed by a connection end 62 of the shaft 10 (see FIG. 4) and a connection (not shown) extending from the motor through a housing 64 of the drive box 60. As can be seen in FIG. 3, the shaft 10 is rotatably supported within a shaft rail 70. The shaft rail 70 preferably includes a bushing sleeve 72, such as a low-friction polymeric sleeve such as Nylon or Delrin. The bushing sleeve 72 is partially cylindrical so that a longitudinally extending portion is removed, and the sleeve 72 has a C-shape with an opening 74 oriented downward when installed. The shaft rail 70 supports the sleeve 72 within a C-shaped portion 76 with an opening 80 co-oriented downwardly with the sleeve opening 74. Therefore, the shaft 10 is exposed from the shaft rail 70 when installed within the sleeve 72.

Figure 5:
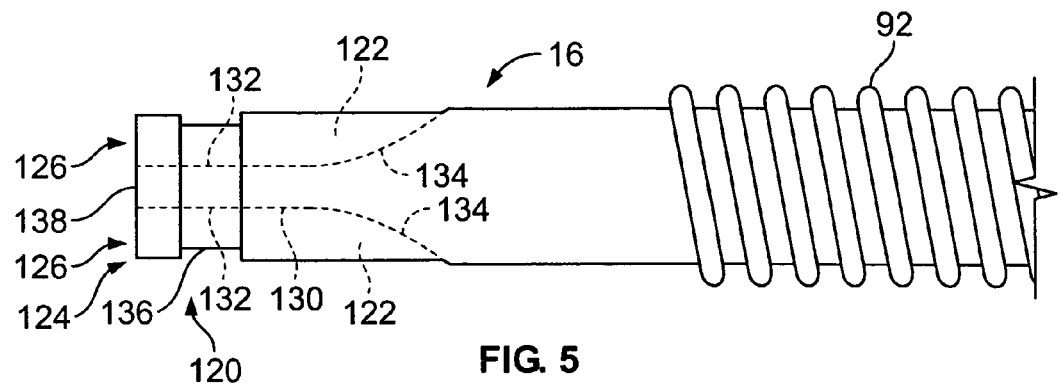
FIG. 5 is a fragmentary side elevational view of the first drive shaft segment showing a first connection end.
Figure 6:
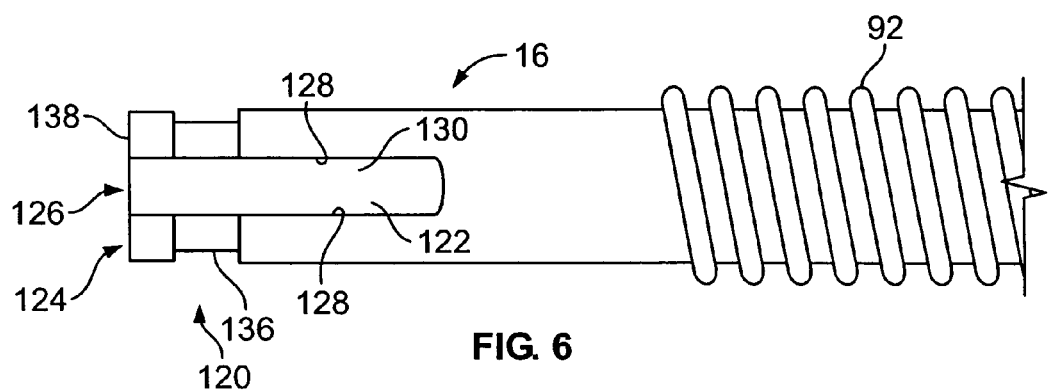
FIG. 6 is a fragmentary side elevational view of the first connection end of the first drive shaft segment rotated ninety degrees from FIG. 5.
Figure 7:
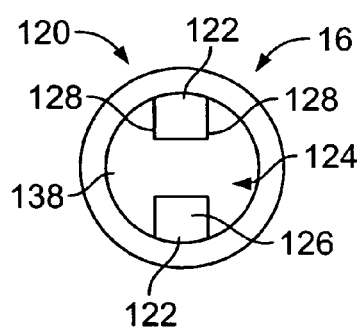
FIG. 7 is an end elevational of the first connection end of the first drive shaft segment.
Figure 10:
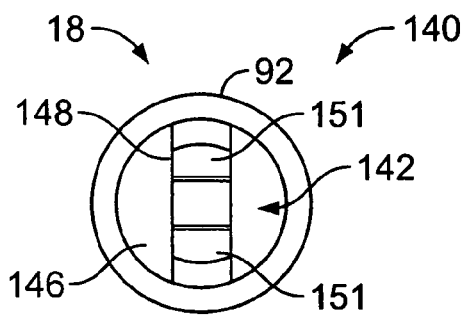
FIG. 10 is an end elevational of the second connection end of the second drive shaft segment.
Figure 11:
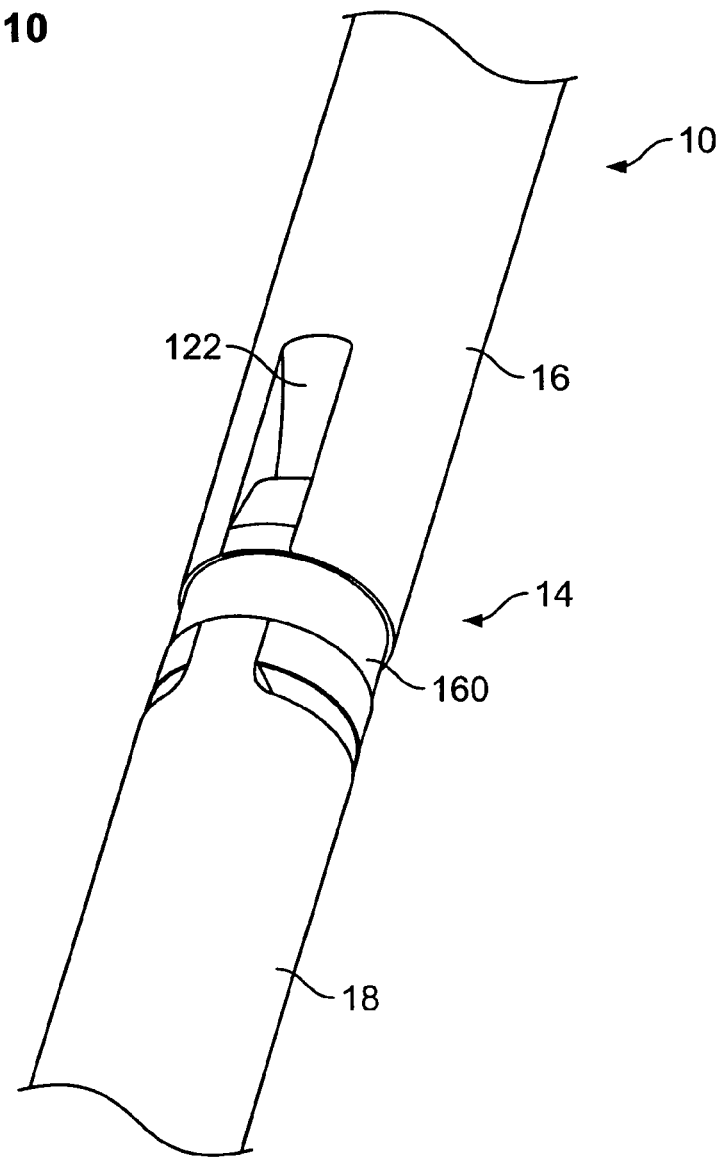
FIG. 11 is a fragmentary perspective view of the joint in an assembled configuration.

The shaft 10 cooperates with a trolley 90 through the openings 74, 80 in the sleeve 72 and shaft rail 70. As can be seen in FIG. 5, the shaft 10 has outwardly extending threads 92 substantially along its length. The trolley 90 includes cooperating structure such as a plurality of pitched teeth 94 which are shaped to cooperate with the shaft threads 92 so as to draw the trolley 90 along the shaft 10 when the shaft 10 rotates around its own axis. The pitch of the teeth 94 is selected according to the pitch of the threads 92 of the shaft 10, which are in turn selected based on how many rotations are used to shift the barrier 22 a particular distance, which is itself a function of power delivery from the motor.

The trolley 90 is supported by the shaft rail 70. The shaft rail 70 includes guide slots 100 extending laterally to the direction of travel of the trolley 90, which is parallel to the axis of rotation of the shaft 10. The trolley 90 includes laterally extending wings or flanges 102 received within the slots 100. As the trolley 90 travels along the shaft rail 70 when the barrier 22 is being moved between or to the open and closed positions, the flanges 102 slide within the slots 100.

To move the barrier 22, the motor rotates the shaft 10 such that the trolley 90 translates along the shaft rail 70. The trolley 90 is connected to the barrier 22 by a bracket 110. The bracket 110 is pivotally connected to both the barrier 22 and the trolley 90. This is due to the fact that, from a closed position, the initial direction of travel for the barrier 22 is in a vertical motion, the travel then transitions through the curved upper portion 46 of the tracks 38, and then finally becomes a generally horizontal direction of motion. In contrast, the trolley 90 generally only moves in a horizontal direction along the shaft rail 70. The bracket 110, thus, pivots to allow the trolley 90 and barrier 22 to move as described.

Figure 4:
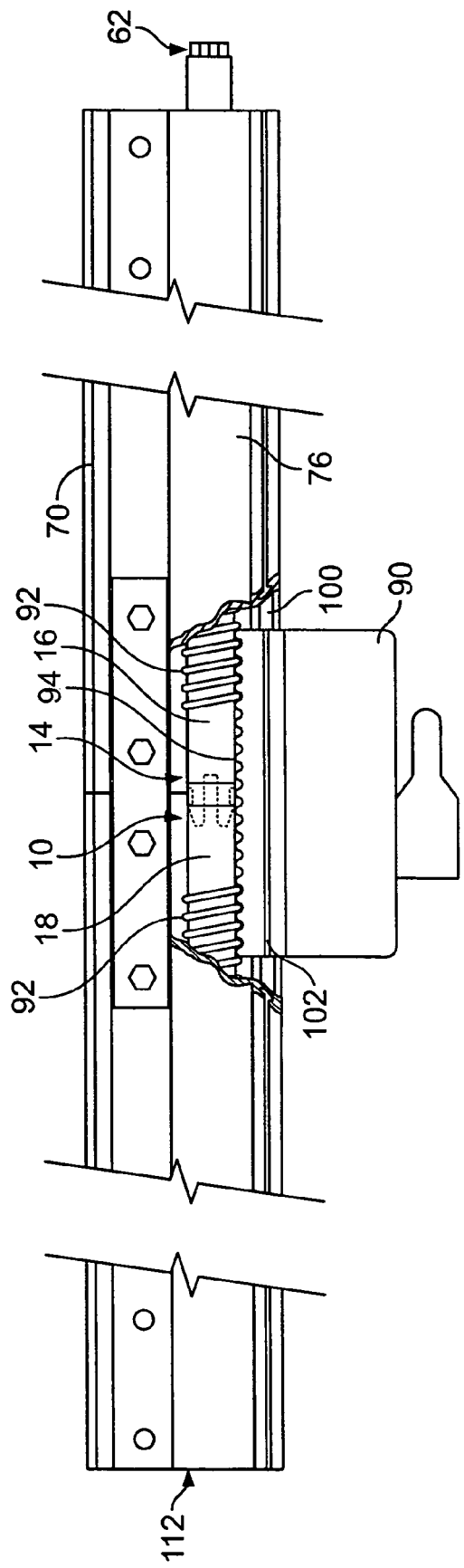
FIG. 4 is a fragmentary view of the support rail showing a joint between the drive shaft segments and the trolley positioned across the joint.

The shaft 10 has a requisite length. The length of the shaft 10 includes the extent of travel required by the trolley 90 to move the barrier 22 between the open and closed positions. As can be seen in FIG. 4, the trolley 90 itself has a particular length for spanning across the connection joint 14. The shaft 10 has the connection end 62 cooperating with the drive box 60, and the extent of travel by the trolley 90 preferably stops short of the drive box 60. The shaft 10 also has a dead end 112, permitted to freely rotate within the rail 70, opposite the connection end 62. It is also preferred that the extent of travel by the trolley 90 stops short of the dead end 112.

The operator system 12 is shipped and provided in a disassembled state so that it is easy to transport, handle, and manipulate. In particular, the shaft 10 is provided in segments, such as the first and second segments 16, 18, to facilitate the same. The segments 16, 18 are coupled by a user or installer at the installation site. It should be noted that the shaft 10, as described, includes the two segments 16, 18, though a greater number may be provided, each segment being connectable with another such as by the connection joint 14, as will be described.

Referring now to FIGS. 1 and 5-12, the first shaft segment 16 is shown having a male connection end 120, the second shaft segment is shown having a female connection end 140, and a connector 160 is shown as a split ring. The split ring 160 is positioned around the male end 120, preferably by the manufacturer prior to the operator system 12 being shipped. The female end 140 is inserted into the male end 120 and the split ring 160 to connect the shaft segments 16, 18.

The male connection end 120 is illustrated in FIGS. 1 and 5-7. The male end 120 is generally cylindrical with a dimension less than the threads 92, or at least less than a depth into which the trolley teeth 94 are received in the threads 92. Accordingly, the teeth 94 are able to travel by or over the joint 14 without interference.

Figure 12:
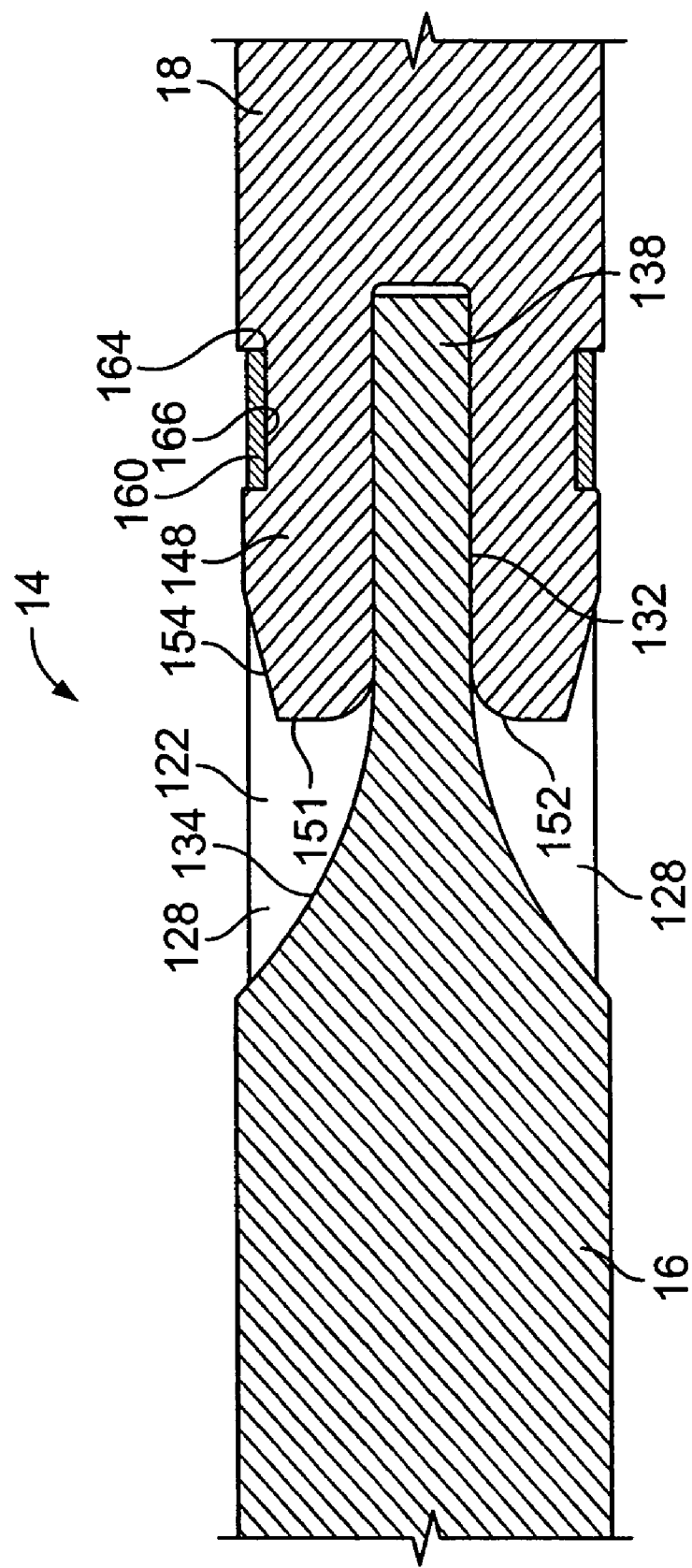
FIG. 12 is a fragmentary cross-sectional view of the joint of FIG. 11.

The male end 120 includes diametrically aligned recesses 122 for receiving the female connection end 140. The first shaft segment 16 has a terminal end 124 including an entrance 126 for each of the recesses 122. Each recess 122 is defined by a opposed side wall 128 and a bottom wall 130, which is preferably orthogonal to the opposed side walls 128. The bottom walls 130 at the entrance 126 have a generally planar portions 132 which are parallel. As the bottom wall 130 extends away from the terminal end 124, it transitions into a sloped portion 134, which slopes outwardly from the planar portion 132 and from the longitudinal axis of the segment 16, as can be seen in FIGS. 1, 5 and 12.

A short distance from the terminal end 124 is a groove 136 for receiving the split ring 160. The split ring 160 includes a slit or gap 162 so that the split ring 160 may expand slightly to be positioned around the segment 16 and, in particular, in the groove 136, and then contract to a tight fit within the groove 136. The split ring 160 and groove 136 are sized so that, once the split ring 160 is positioned within the groove 136, the diametrical size therealong is at least less than the depth into which the trolley teeth 94 are received in the threads 92 so that the teeth 94 are able to travel over the split ring 160 without interference. The terminal end 124 of the segment 16 forms a generally flat face 138 and on a radial plane orthogonal to the longitudinal axis.

The female connection end 140 is illustrated in FIGS. 1 and 8-10. The female connection end 140, like the male connection end 120, is generally cylindrical with a dimension at least less than the depth into which the trolley teeth 94 are received in the threads 92 so that the teeth 94 are able to travel by the joint 14 without interference.

As can be seen in FIG. 9, the female end 140 includes a pair of oppositely positioned cutouts 142 that are generally parallel to each other and to the longitudinal axis of the shaft 10. Each cutout 142 extends a distance from a terminal end 144 of the segment 18 to a shoulder 146 radially extending from and orthogonal to the shaft segment longitudinal axis.

With the cutouts 142, the female end 140 includes opposed connection prongs 148 for mating with the male connection end 120. A cutout or recess 150 is formed between the prongs 148. Each prong 148 has an end face 151 at the terminal end 144 that includes an inner edge 152 that is preferably rounded or the like. As the female end 140 is connected to the male end 120, the male end recess bottom walls 130 are received between the prongs 148 and in the recess 150. The inner edge 152 forms a chamber or wedge to promote reception of the prongs 148 in the male end recesses 122.

Each prong 148 includes a chamber or bevel 154 leading from the end face 151 and extending outwardly therefrom, as can be seen in FIGS. 8 and 12. As the female end 140 is brought into engagement with the male end 120, the bevels 154 contact a leading edge 164 and/or inner surface 166 of the split ring 160 to force expansion of the split ring 160. A short distance from the bevel 154 and along the outer surface of the prong 148 is a recess 156 having a general shape to match the split ring 160 and the groove 136 of the male end 120. When the female connection end 140 has been received the proper amount in the male end 120, the prong recess 156 is aligned with the male end groove 136. The split ring 160 is then able to contract so that it is received in both the prong recesses 156 and in the male end groove 136.

The connection joint 14 formed by inserting the female connection end 140 within the male connection end 120 and the split ring 160 is substantially rigid. That is, at the proper insertion depth for the female connection end 140, the split ring 160 is received within the prong recesses 156 and male end groove 136 so that excess space, or play, is minimized. In other words, the prong recesses 156 and the male end groove 136 are preferably configured to closely match in diametrical geometry and axial length so that the split ring 160 fits closely within each simultaneously.

The mating between the female and male ends 140, 120 further promotes the rigidity of the connection joint 14. The sidewalls 128 of the male end recesses 122 are configured to closely match against the prongs 148 within the cutouts 142, which serves to guide the prongs 148 therewithin. The recess 150 between the prongs 148 is closely sized and shaped for the male end 120 between its bottom walls 130, also serving to guide the connection. These features limit the axial deviation of the first segment 16 from the second segment 18. Though not shown as such, the female and male ends 140, 120 may be connected to a depth such that a terminal face 158 of the female end recess 150 may abut flushly with the face 138 on the male terminal end 124. Alternatively, the female end shoulder 146 may contact flushly against the male terminal end face 138. As a further alternative, the female end recess 150 may be cut to a depth coincident or co-planar with the female end shoulder 146 so that both its terminal face 158 and the female end shoulder 146 abut the male terminal end face 138.

For a user, assembling the joint 14 for the shaft 10 including the first and segments 16, 18 having the male and female connection ends 120, 140 is simplified. The split ring 160 may be pre-assembled with the male connection end 120 so that the user merely handles the first and second segments 16, 18. The user may grasp the segments 16, 18, align the prongs 148 with the recess entrances 126, and connect the segments 16, 18 with a single, linear motion. The male and female connection ends 120, 140 are self-securing as the split ring 160 will expand as necessary and then contract when the female end 140 is inserted to the proper depth. The joint 14 is thus formed.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of forming an elongated drive shaft for a movable barrier operator system for moving a movable barrier between positions, the steps comprising:

aligning a first shaft segment having a first shaft segment longitudinal axis of rotation and a first connection end with a first shaft segment groove on an outer portion of the first connection end to a second shaft segment having a second shaft segment longitudinal axis of rotation and a second connection end with a second shaft segment groove on an outer portion of the second connection end along a common axis of rotation, the first shaft segment including an expandable portion set in the first shaft segment groove, each of the grooves having bottom surfaces facing outward from a longitudinal axis of the drive shaft;

joining the first and second connection ends by forcing a cooperating structure of each connection end to be received by cooperating structure on the other connection end which joining includes forcing the cooperating structure of the second connection end against the first connection end to expand the expandable portion of the first shaft segment, the first and second segments having generally planar walls which abuttingly engage each other to effect rotational motion to the drive shaft when driven; and contracting the expandable portion at the first shaft segment groove and the second shaft segment groove with a connector which expands and then contracts when the first shaft segment groove aligns with the second shaft segment groove and the connector is seated in the bottom surfaces of the grooves to join the first and second shaft segments.

2. The method of claim 1 further including the step of:

aligning a portion of the cooperating structure on the second connection end with the expandable portion and with a portion of the cooperating structure of first connection end.

3. An elongated drive shaft for a movable barrier operator having an axis of rotation comprising:

a second shaft segment having a second connection end including a second shaft segment recess defined by opposite side walls facing inward towards a second shaft segment longitudinal axis, the second connection end including outer walls having a second shaft segment connector recess having a bottom surface;

a first shaft segment having a radially expandable first connection end including opposing inner walls facing outwardly away from a first shaft segment longitudinal axis, the opposing inner walls defining a first shaft segment portion received between the opposite side walls of the second shaft segment recess, the first shaft segment having an outer surface which includes a groove having an outwardly facing bottom surface, the first shaft segment portion linearly received in the second shaft segment recess, the outwardly facing walls of the first segment and the opposite side walls of the second shaft segment recess abuttingly engaging each other to effect rotational motion to the shaft when driven, and the radially expandable first connection end expanding as the second shaft segment engages the first shaft segment, the second shaft segment connector recess aligning with the groove;

a radially expandable and radially contractible connector disposed in the second shaft segment connector recess and the groove to restrict separation between the first and second shaft segments wherein the connector is expandable to permit connection between the shaft segments and contracting to secure the connection between the first shaft segment and second shaft segment when seated on the bottom surfaces of the second shaft segment connector recess and the groove.

4. The shaft of claim 3 wherein each of the opposing inner walls of the first shaft segment is bound by respective side walls extending outward from the outwardly facing inner walls, the inner wall and side walls define first shaft segment recesses, the second shaft segment recess defined by a pair of prongs extending from the second shaft segment, and the prongs are received within the first shaft segment recesses, and the connector defining a depth of insertion for the second shaft segment received in the first shaft segment recess.

5. The shaft of claim 4 wherein the first shaft segment inner walls and the side walls cooperate with the second shaft segment prongs to limit axial deviation between the first and second shaft segments.

6. An elongated drive shaft for a movable barrier operator having an axis of rotation comprising:

a second shaft segment having a second connection end having a second shaft segment recess defined by opposite side walls facing inward towards a second shaft segment longitudinal axis, the second connection end including outer walls having a connector recess;

a first shaft segment having an expandable first connection end having a structure including opposite inner walls facing outwardly from a first shaft segment longitudinal axis, the first shaft segment having a groove, the first shaft segment received in the second shaft segment recess;

a radially expandable and radially contractible connector which restricts separation between the first and second shaft segments the connector being expandable to permit connection between the shaft segments and contractible to secure the connection between the first shaft segment and second shaft segment when the connector is seated in the groove and connector recess and the second shaft segment recess is radially aligned with the first connection end and inserted into the first connection end to permit the opposite side walls of the second connection end to engage the opposite inner walls of the first connection end to effect rotational motion to the drive shaft when driven, the connector defining a depth of insertion for the second shaft segment received in the first shaft segment recess.

7. An elongated drive shaft for a movable barrier operator having an axis of rotation comprising:

a second shaft segment having a second connection end including a second shaft segment recess defined by opposite side walls facing inward towards a second shaft segment longitudinal axis, the second connection end including outer walls having a connector recess;

a first shaft segment having a radially expandable first connection end including a structure including opposite inner walls facing outward from a first shaft segment longitudinal axis, the first shaft segment having an outer surface which includes a groove, the first shaft segment received in the second shaft segment recess, the outwardly facing walls abuttingly engaging the inward facing walls to effect rotation of the shaft when driven;

a radially expandable and radially contractible connector which restricts separation between the first and second shaft segments when the connector is expanded and contracted to effect connection between the shaft segments when the connector is seated in the groove and connector recess, the connector defining a depth of insertion for the first shaft segment received in the second shaft segment recess when it is seated in the groove and connector recess.

8. The elongated drive shaft for a movable barrier operator of claim 7 wherein the connector is a split ring.

9. A movable barrier operator comprising:
a shaft including:
  a first shaft segment having a threaded portion, an outer groove, and an expandable first connection end having a first shaft segment recess and a first shaft segment structure; and
  a second shaft segment having a threaded portion, a connector recess, and a second connection end with a connector recess;
a drive for rotating the shaft around a longitudinal axis;
a connector disposed in at least one of the outer groove and the connector recess, the connector comprising a split ring configured to restrict separation between the first and second shaft segments and to permit connection between the shaft segments;
a trolley having structure for engaging the threaded portions of the shaft and structure for operably connecting with the movable barrier,
wherein the first connection end includes surfaces facing outwardly from a first shaft segment longitudinal axis, the second connection end includes prongs having opposed side walls facing inward towards a second shaft segment longitudinal axis to define the second shaft segment recess, wherein the first shaft segment structure is linearly received within the second shaft segment recess, the surfaces facing outwardly from the first shaft segment being bound by respective side walls extending outward from the outwardly facing surfaces, the outwardly facing surfaces and side walls defining first shaft segment recesses, the prongs being received within the first shaft segment recesses, and the connector defining a depth of insertion for the second shaft segment received in the first shaft segment recess.

10. A movable barrier operator comprising:
a shaft including:
  a first shaft segment having a threaded portion and an expandable first connection end having a first shaft segment recess and a first shaft segment structure; and
  a second shaft segment having a threaded portion and a second connection end;
a drive for rotating the shaft around a longitudinal axis;

an expandable connector which restricts separation between the first and second shaft segments;

a trolley having structure for engaging the threaded portions of the shaft and structure for operably connecting with the movable barrier, wherein the first connection end includes surfaces facing outward from a first shaft segment longitudinal axis, the second connection end having a second shaft segment recess defined by opposed side walls facing inward towards a second shaft segment longitudinal axis, wherein the second shaft segment side walls are formed on a pair of prongs extending from the second shaft segment, an outer surface on each of the prongs includes the connector recess, the prongs having the opposed side walls facing inward towards a second shaft segment longitudinal axis, the first connection end having an outer surface with the groove, the first connection end having two recesses to receive the prongs and the connector recess aligned with the groove to receive the expandable connector therein, and a connector recess having an outwardly facing bottom surface, the first connection end having an outer wall which has a groove having a bottom surface, wherein the first shaft segment structure is linearly received within the second shaft segment recess, the expandable connector received on the bottom surface of the connector recess on the second shaft segment and on the bottom surface of the groove on the first shaft segment permitting connection between the shaft segments and holding the segments together.

11. A shaft for transmitting rotational energy comprising:
a first shaft segment defining a first recess and a second recess on opposite sides of a first shaft segment portion disposed in a central longitudinal axis of the first shaft segment, the first shaft segment portion disposed in a central longitudinal axis of the first shaft segment, the first shaft segment comprising an expandable end and a first shaft segment groove on and around an outer bottom surface of the expandable end, wherein the first shaft segment recesses are defined by outwardly facing opposing inner walls which are bound by respective generally planar side walls extending outward from the outwardly facing inner walls, the prongs of the second shaft segment being received within the first shaft segment recesses to abutting engage the side walls;

a second shaft segment defining two prongs sized to fit into the first recess and the second recess, the two prongs defining a space disposed in a central longitudinal axis of the second shaft segment, the space sized to receive the first shaft segment portion, the second shaft segment comprising a second shaft segment connector recess having a bottom surface in an outer portion of the second shaft segment;

an expandable connector sized to fit into the first shaft segment groove and on the bottom surface thereof and fit into the second shaft segment connector recess and on the bottom surface thereof when the first shaft segment groove and the second shaft segment connector recess are aligned with the first shaft segment engaging the second shaft segment along a common longitudinal axis of rotation.

* * * * *